United States Patent [19]

Deutsch

[11] Patent Number: 4,800,513
[45] Date of Patent: Jan. 24, 1989

[54] AUTO-CALIBRATED SENSOR SYSTEM

[75] Inventor: Robert W. Deutsch, Sugar Grove, Ill.

[73] Assignee: Motorola, Inc., Schaumburg, Ill.

[21] Appl. No.: 891,938

[22] Filed: Aug. 1, 1986

[51] Int. Cl.[4] .................. G06F 15/20; G01K 15/00
[52] U.S. Cl. ........................ 364/571.02; 364/550; 73/1 R; 73/765
[58] Field of Search ............... 364/557, 571, 550, 508; 374/165, 210; 73/1 R, 765, 766, 1 B; 324/98, 101

[56] References Cited

U.S. PATENT DOCUMENTS

4,280,196 7/1981 Hornak et al. .................. 365/45
4,446,715 5/1984 Bailey ............................. 73/1 R Primary Examiner—Parshotam S. Lall
Assistant Examiner—Ellis B. Ramirez
Attorney, Agent, or Firm—John H. Moore

[57] ABSTRACT

A self-calibrating sensor system is disclosed wherein a processing circuit, normally including an amplifier, receives the output of at least one sensor to develop a processed sensor signal. To compensate for errors (gain error, etc.) in the processing circuit, the preferred embodiment includes a microprocessor which senses certain signals developed by the processing circuit, computes correction factors based on the sensed signals, and then modifies the processed sensor signal so as to substantially eliminate the effect of the errors.

9 Claims, 5 Drawing Sheets

$\mathcal{E}q.\ 1 \quad V_{O(N)}\ \text{CORRECTED} = A\ V_{O(N)} + B$ $\mathcal{E}q.\ 2 \quad A = \dfrac{1 + GVI}{1 + GVI + dK2}$ WHERE GVI IS THE IDEAL VOLTAGE GAIN
AND dK2 IS THE GAIN ERROR $\mathcal{E}q.\ 3 \quad dK2 = \dfrac{V_{O(X)} - C_{OFF} - V_{T(X)}(1+GVI) + V_{OFI}(GVI)}{V_{T(X)} - V_{OF}}$ $\mathcal{E}q.\ 4 \quad B = \dfrac{\left[(1+GVI)(dK3(GVI+dK2) - C_{OFF})\right] + (V_{OFI})(dK2)}{1 + GVI + dK2}$ WHERE dK3 IS THE ERROR IN THE OFFSET
VOLTAGE $V_{OF}$ RESULTING FROM TOLERANCES IN
THE RATIO OF R2 AND R3,
AND $C_{OFF}$ IS A MEASURE OF THE AMPLIFIER
OFFSET ERROR PLUS LEAKAGE EFFECTS.

AUTO-CALIBRATED SENSOR SYSTEM

FIELD OF THE INVENTION

This invention is directed generally to the field of sensors (such as temperature sensors), and more particularly to sensor circuitry for developing more accurate sensor readings with a high degree of resolution.

BACKGROUND OF THE INVENTION

Wherever a sensor is used to measure a variable such as temperature, it is usually desirable to develop a sensor output signal which is accurate and which can be read with a reasonably high degree of resolution. Unfortunately, accuracy and resolution are not easily obtained simultaneously.

For example, in applications in which a sensor output signal must be digitized by an A/D (analog to digital) converter, it is frequently necessary to amplify the sensor's output signal in order to make full use of the range of the A/D converter. Such amplification improves resolution, but tolerances in the amplifier and its associated circuitry cause errors in the digitized sensor reading. These errors can include offset voltage errors, gain errors, and error components resulting from the cross-products of offset and gain errors. Such errors are illustrated in FIG. 1 which graphs the output voltage of a hypothetical temperature sensor.

Figures 1, 2:
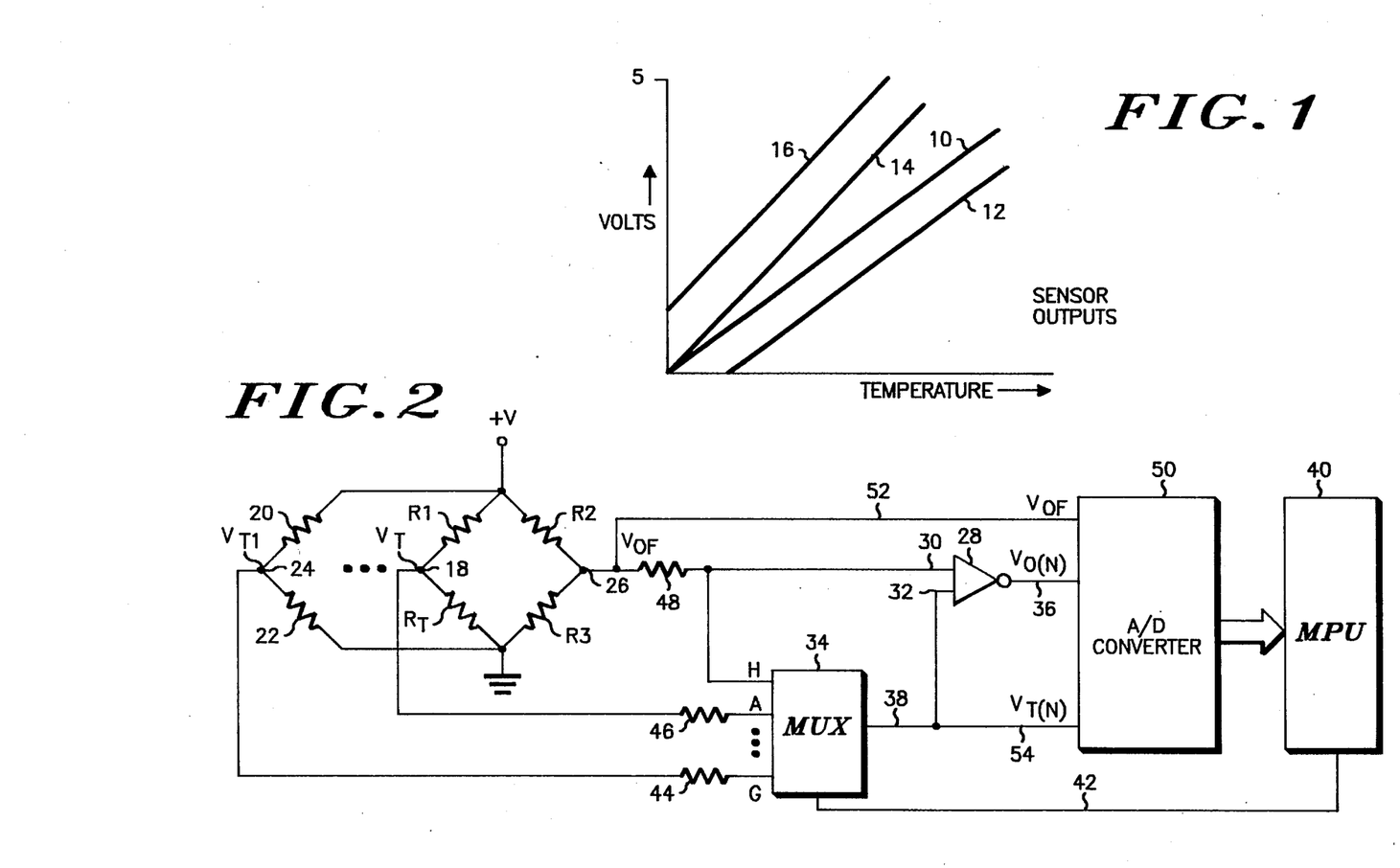
FIG. 1, referred to previously, is a plot of sensor output voltage versus temperature, and illustrates the kinds of errors which can affect a sensor's output voltage.
FIG. 2 shows a preferred embodiment of a self-calibrating system for processing the outputs of a plurality of sensors according to the invention.

In FIG. 1, the line 10 illustrates an ideal, linear sensor output signal. Line 12 depicts a sensor output signal which is offset from the origin of the graph and which is said, therefore, to have an offset error. Line 14 represents a sensor output signal having a gain error insofar as its amplitude differs from the output of the signal depicted by line 10. Line 16 illustrates a sensor output signal which includes both a gain error and an offset error, and is typical of the signal developed by a sensor and its associated amplifier circuitry. To identify and compensate for such errors is possible and has been accomplished with some degree of success. However, the gain and offset errors give rise to error components referred to herein (and discussed in more detail below) as cross-product errors which cannot be readily isolated and which are difficult to fully compensate for.

In some applications, a plurality of sensors are required, and the output of each must be amplified and otherwise processed. Each such sensor and its associated circuitry is considered as a separate sensor channel. This need for plural channels gives rise to yet another possibility for error; namely, the channel-to-channel error that results when the various channels do not precisely track with each other.

The foregoing discussion illustrates the need for an improved sensor circuit, and particularly for a sensor circuit which compensates for the errors discussed above.

OBJECTS OF THE INVENTION

It is a general object of the invention to provide an improved sensor circuit which overcomes the above-mentioned difficulties in providing high resolution and high accuracy.

It is another object of the invention to provide such a circuit which is adapted for use in multi-channel applications.

It is a more specific object of the invention to provide a sensor circuit which automatically compensates for offset errors, gain errors and cross-products thereof to provide a highly accurate sensor signal with high resolution.

Brief Description of the Figures

FIG. 3 shows equations which are useful in describing some of the errors which are corrected by the present system and how those errors are preferably compensated for;

DESCRIPTION OF THE PREFERRED EMBODIMENT

Referring to FIG. 2, a temperature sensor is shown which includes resistors R1 and $R_T$, along with processing circuitry for amplifying the output of the sensor, and correcting circuitry for measuring errors present in the processing circuit and for compensating for the measured errors so as to develop a corrected sensor output signal. The ability of the illustrated system to measure and compensate for such errors is due in part to the structure of the illustrated system and in part to a software program to be described later.

Referring again to the resistors R1 and $R_T$, the resistor R1 is preferably a metal film resistor having a one percent tolerance and a temperature coefficient of 50 ppm (parts per million). The resistor $R_T$ has a resistance which varies with temperature. For example, the value of the resistor RT may be approximately 1580 ohms at a temperature of −40° centigrade, and about 3100 ohms at a temperature of +150° centigrade.

The resistors R1 and $R_T$ are coupled as shown in series between a DC supply voltage +V and ground to develop at their junction (node 18) a sensor output signal $V_T$ that varies as a function of temperature. It is this signal $V_T$ which is to be amplified, processed and corrected as described later herein to provide a sensor signal with high resolution and high accuracy.

The illustrated system is designed to accommodate a plurality of sensors, as illustrated by the inclusion of resistors 20 and 22 which are connected in series with each other and in parallel with resistors R1 and $R_T$. The resistor 20 may be similar to or identical to the resistor R1 and the resistor 22 may be similar to or identical to the resistor $R_T$ so as to develop an additional sensor output signal $V_{T1}$ at the juncture of resistors 20 and 22 (node 24). The remainder of the circuitry shown in FIG. 2 essentially comprises circuitry to amplify the output of a selected sensor and to compensate for any errors which are introduced.

In parallel with the sensor comprising resistors R1 and $R_T$ is a voltage divider made up of resistors R2 and R3 which are connected in series with each other to develop a reference voltage ($V_{OF}$) at their juncture (node 26). The resistors R2 and R3 may be of the same type as the resistor R1 described earlier. The reference voltage developed at the node 26 is a voltage against which the sensor voltage $V_T$ (and other sensor voltages $V_{T1}$, etc.) will be compared to develop an amplified sensor output signal.

To amplify a selected sensor output signal, an amplifier 28 is included which has a first input terminal 30 coupled to receive the reference signal $V_{OF}$. A second input terminal 32 is coupled to the output of a switch which preferably takes the form of a multiplexer 34 which has multiple inputs. Referring again to the amplifier 28, it includes an output terminal 36 at which an amplified signal $V_{O(N)}$ is developed.

Referring to the multiplexer 34, its multiple inputs are shown as including a first input designated as H and additional inputs which are designated as A through G. Each of the inputs A-G receives a different sensor output signal. As will be discussed in more detail later, the input designated H is selected and used for calibration purposes when the processing circuit is in a calibration mode. When an operational mode is in effect, a selected one of the inputs A-G is amplified and corrected under the control of a programmed microprocessor 40. More specifically, the microprocessor 40 is programmed to enable the multiplexer 34 via an address bus 42 so as to cause the multiplexer 34 to couple its channel H input to the output terminal 38 when the processing circuit is in a calibration mode during which errors in the processing circuit are detected. When the processing circuit is in the operational mode, a selected one of the other channel inputs A-G becomes coupled to the output terminal 38, and the selected channel input becomes amplified by amplifier 28 and further processed to compensate for any errors detected during the calibration mode.

It is preferred to include a protective impedance network between the output of each sensor and the input to the multiplexer 34 to protect against voltage spikes and the like. In this embodiment, the protective impedance network between the multiplexer and the node 24 is shown as a resistor 44. Likewise, a resistor 46 is coupled the channel A input to the multiplexer 34 and the node 18. For reasons which will be described later, another resistor 4 is coupled between the node 26 and the input 30 to the amplifier 28. Preferably, the resistors 44, 46 and 48 are of substantially equal values.

Referring again to the amplifier 28, its output (node 36) is coupled to an input of an A/D converter 50 which accepts the analog input from node 36, converts it to a digital value, and inputs it to the microprocessor 40 in the conventional manner. Although the A/D converter 50 is illustrated as being a separate item from the microprocessor 40, the A/D converter 50 may be included in the microprocessor 40.

There are two further inputs to the converter 50. One is the reference voltage $V_{OF}$ which is coupled to an input of the converter 50 via a line 52. The other input to the converter 50 is the signal which appears on the output terminal 38 of the multiplexer 34. This input is coupled to the converter 50 via a lead 54 and the voltage thereon is referred to herein as $V_{T(N)}$. The voltage $V_{T(N)}$ will correspond to the signal on the one input H or A-G which is selected by the microprocessor to be coupled through the multiplexer 34.

Before describing the operation of the system shown in FIG. 2 and how it compensates for errors, it is appropriate to first discuss some of the errors that arise in such a system and which of those errors are compensated for in the illustrated embodiment. One type of error which arises in any such system is the error which is associated with the accuracy of the sensor itself. This type of error is not treated by the present system. Contact and wiring resistant errors are also errors which are not corrected by the present system. On the other hand, an error which is corrected by the present system is referred to as "offset resistor ratio error" (referred to later as dK3) and is created by the tolerances associated with the resistors R2 and R3. This error gives rise to an offset voltage error in $V_{OF}$ and is corrected as described below.

"Amplifier offset error" is an error which is created by the offset voltage associated with the amplifier 28, and this error is also corrected as described later. Bias current error arising from bias currents from the input pins of the amplifier 28 is another form of error which is corrected as described later.

Another error which is corrected is that due to leakage current through the multiplexer 34. This leakage has two distinct components. One such leakage occurs between each input pin of the multiplexer and ground and may be approximately 1 microampere. The other component is due to leakage between input pins and is also in the range of about 1 microampere. Finally, the gain error associated with amplifier 28 is another error which is corrected by the present system.

Having described the type of errors the present system corrects for, reference is now made to FIG. 3 which depicts equations 1–4 which are mathematical expressions useful in describing some of the errors discussed above and in describing the type of correction which takes place as described later. Referring first to equation 1, $V_{O(N)}$ Corrected indicates a sensor output voltage which has been amplified at terminal 36, measured, and compensated for by multiplying the measured voltage at terminal 36 by a factor A and combining the result with a correction factor B. A and B are corrective factors which are calculated by the microprocessor 40 in response to measurements made during a calibration cycle. Once the calibration cycle is completed, a sensor output voltage is present on the terminal 36, is measured, and is then corrected by use of the factors A and B as illustrated by equation 1.

The corrective factor A is defined by equation 2 in which GVI is the ideal voltage gain of the amplifier 28 and dK2 is the gain error as defined by equation 3. In equation 3, $V_{O(X)}$ indicates any voltage appearing at the node 36 other than a voltage due to channel H being coupled through the multiplexer to its output terminal 38. In other words, $V_{O(X)}$ is any amplified sensor output voltage. $C_{OFF}$ is a measure of the amplifier offset error plus leakage effects. The calculation of the $C_{OFF}$ is described later.

$V_{T(X)}$ is a voltage which appears on the lead 54 at the same time that the voltage $V_{O(X)}$ appears on the lead 36. $V_{OF}$ is the reference voltage shown at the node 26 in FIG. 2, and $V_{OFI}$ is the ideal reference voltage which would be developed by resistors R2 and R3 in the case where the ratio of $R_2$ and $R_3$ has its ideal value.

The additive corrective factor B is defined by equation 4 where dK3 is the error in the ratio of the resistances of R2 and R3. The other factors in equation 4 have already been defined.

Some of the factors such as GVI, $V_{OFI}$ and the like are constants which are preferably included in the memory of the microprocessor 40. The variables such as $V_{T(x)}$ and $V_{O(x)}$ are variables which are sensed by the A/D converter 50, digitized, and input to the microprocessor 40 for use in calculating the corrective factors A and B.

Having described the types of errors which the present system corrects and having briefly described, in connection with the equations shown in FIG. 3, the nature of the corrections, the corrective method which is employed will now be described in more detail by way of the flow charts shown in FIGS. 4 and 5 and the structure which is shown in FIG. 2. The flow chart shown in FIG. 4 illustrates a software program which is stored in the microprocessor 40. This particular program constitutes a calibrate routine by which the A/D converter 50 senses and digitizes selective signals developed by the processing circuit and transfers the digitized information to the microprocessor 40. The microprocessor 40 uses the information received from the converter 50 to calculate the corrective factors A and B (see equations 2 and 4). The system then goes into its operational mode to initiate a correction routine during which the output of a selective sensor is amplified, the amplified signal is sensed and digitized by the converter 50, and the microprocessor 40 combines the corrective factors A and B with the measured output of the amplifier 28 to provide a corrected output signal as shown by equation 1. That output signal may be stored in the microprocessor's memory for further use or may be coupled to an output port (not shown) for transmission to other circuitry as required.

Referring now to FIG. 4, the calibrate routine begins with an instruction 54 which causes the multiplexer 34 to connect its channel H input terminal to its output terminal 38. This is accomplished by the microprocessor 40 sending the appropriate address to the multiplexer 34 via the bus 42. As a consequence of this action, the input lead 32 of the amplifier 28 receives the channel H signal which comprises the reference voltage $V_{OF}$ plus any voltage drops across the resistor 48 due to leakage currents. The same signal is applied to the other input terminal 30 of the amplifier 28. In addition, the same signal is applied as an input to the converter 50 via the lead 54. The other two inputs to the converter 50 are the amplified output of the amplifier 28 and the reference voltage which is coupled to the converter via the lead 52.

Referring again to FIG. 4, the next step of the calibration routine, as indicated by instruction 56, causes the microprocessor to store the digitized values of the signals $V_{OF}$, $V_{O(H)}$, and $V_{T(H)}$ [$V_{O(H)}$ is the value of $V_{O(N)}$ when channel H is selected and $V_{T(H)}$ is the value of $V_{T(N)}$ when the channel H is selected]. Next, instruction 58 causes the microprocessor to filter the signals $V_{OF}$ and $V_{O(H)}$ to reduce system noise and quantizing error. Such filtering is preferably accomplished by the conventional technique of taking a rolling average which uses a time constant much lager than the sample time of $V_{OF}$ and $V_{O(H)}$.

Next, instruction 60 causes the microprocessor to calculate dK3 which is the error in the ratio of the resistances of R2 and R3. The microprocessor computes the value of this error by subtracting from $V_{OF}$ (the reference voltage) the stored value of the ideal reference voltage $V_{OFI}$ which would be developed in the case where R2 and R3 would have their ideal values. The calculated value of dK3 is used later to compute the value of the corrective factor B.

The next instruction 62 causes the microprocessor to calculate the value of $C_{OFF}$ which is a measure of the offset of the amplifier 28 times its gain plus leakage effects. As shown, the value of $C_{OFF}$ is calculated by subtracting the filtered value of $V_{OF}$ (measured per instruction 56 and filtered per instruction 58) from the filtered value of $V_{O(H)}$ (also measured per instruction 56 and filtered per instruction 58). The calculated value of $C_{OFF}$ will be used later to compute the gain error of the amplifier 28 and also to compute the value of the corrective factors A and B.

Instruction 64 now causes the microprocessor to select any other sensor channel A-G. The channel which is selected is identified as (x). This causes the multiplexer 34 to couple one of the channel inputs A-G to its output terminal 38 so that the output of the amplifier 36, now identified $V_{O(x)}$, is an amplified sensor signal as opposed to an output resulting from the calibration mode of operation. With the sensor channel (x) now selected, the next instruction 66 causes the microprocessor to measure the values of $V_{O(x)}$ (the signal now at mode 36) and $V_{T(x)}$ (the signal now on lead 54). The measured values are then filtered (as by the rolling average method mentioned above) per instruction 68.

At this point, the microprocessor has sufficient information, either measured in accordance with the previous instructions or stored in its memory, to calculate the value of dK2 which is the value of the gain error associated with the amplifier 28. Instruction 70 causes this calculation to occur as expressed by equation 3 of FIG. 3.

Figure 3:
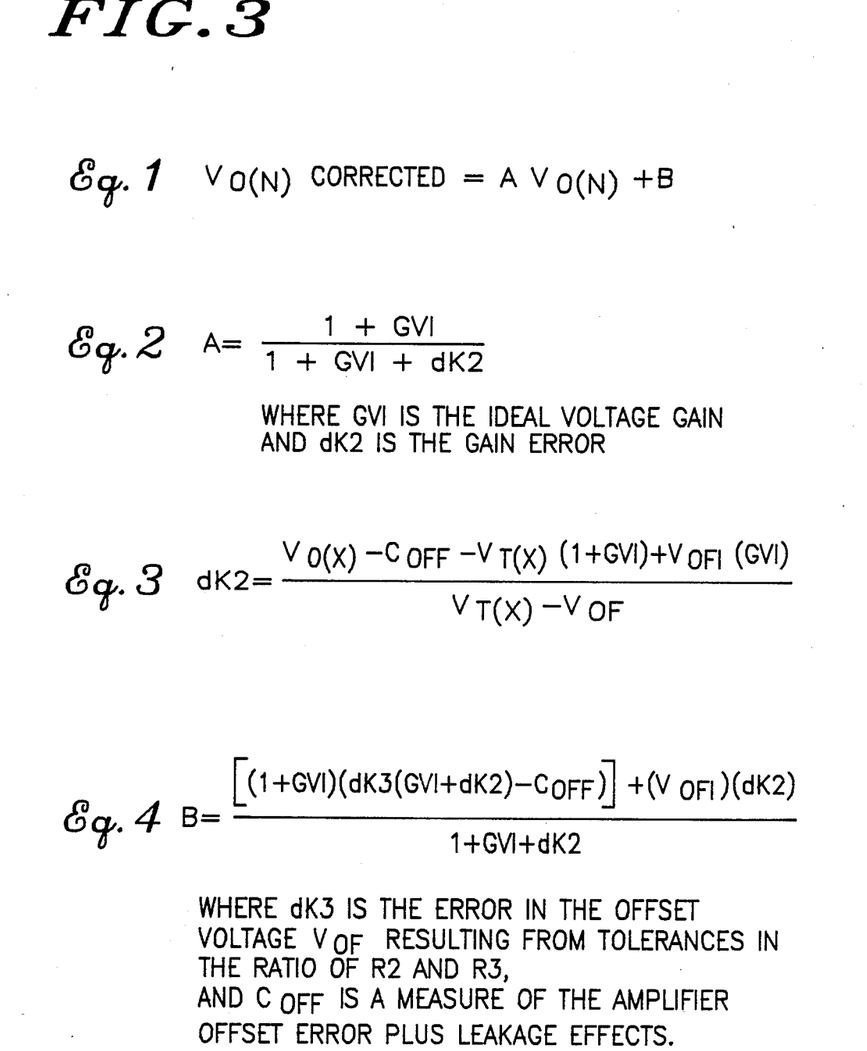
Figure 4:
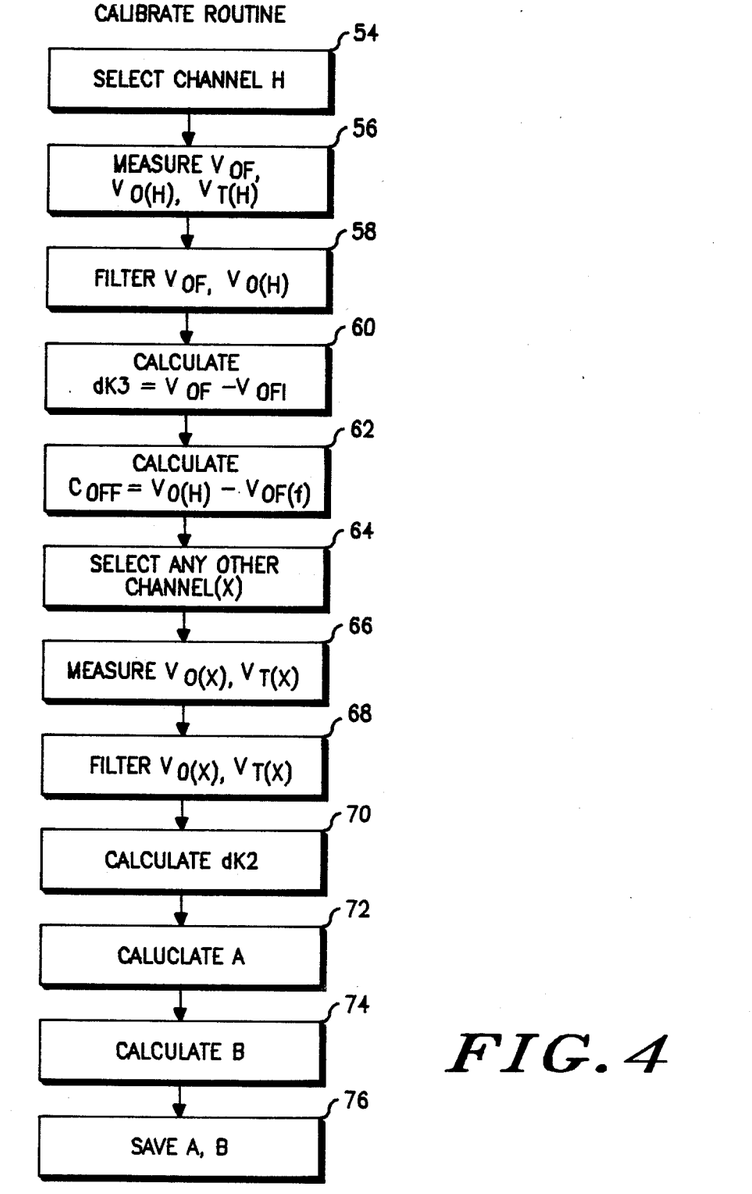
FIGS. 4 and 5 are flow charts illustrating a software program which controls the microprocessor shown in FIG. 2.

Proceeding to instruction 72, the microprocessor 40 calculates the value of the multiplier corrective factor A in accordance with equation 2 of FIG. 3. Next, instruction 74 causes the microprocessor to calculate the value of the additive corrective factor B as set forth in equation 4. Note that in equation 4 the term "dK2" (the gain error) becomes multiplied times dK3 (the error in the offset voltage $V_{OF}$ resulting from the tolerances in R2 and R3). This is the cross product term that has been referred to hereinabove. Thus, the additive factor B will compensate for errors due to the cross products of gain error and offset error. Referring back to FIG. 4, the next instruction 56 causes the microprocessor to save the calculated values for A and for B so that they may be used in the correction routine which will now be described.

Figure 5:
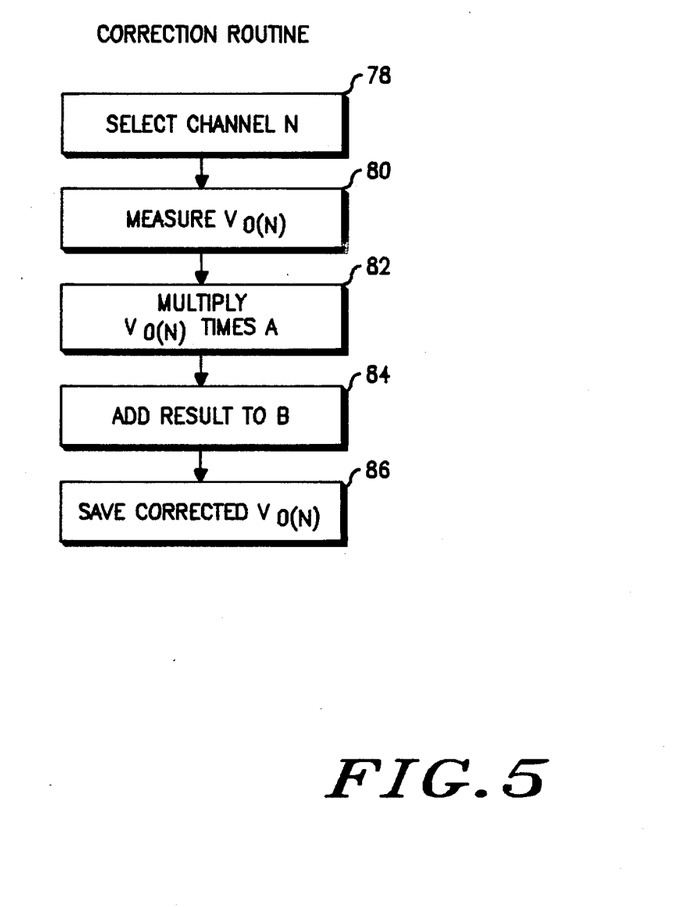

Referring to FIG. 5, the illustrated flow chart depicts the steps used by the microprocessor to correct the measured value of an amplified sensor output signal on one of the channels A-G so as to compensate for the above mentioned errors in the processing circuit. First, instruction 78 causes the microprocessor to enable the multiplexer 34 to select a channel N which will be one of the channels A-G requiring measurement. Next, instruction 80 causes the microprocessor to measure the signal at the output of amplifier 28. The measured value of that signal is then multiplied times the corrective factor A which was calculated by the calibrate routine shown in FIG. 4. The result of that multiplication is then, per instruction 84, added to the corrective factor B which was also calculated during the calibrate routine. Thus, the execution of instructions 82 and 84 have corrected the measured value of the output of amplitude 28 in accordance with equation 1 (FIG. 3). The corrected result is then saved by the microprocessor as required by the next instruction 86.

The system as thus far described has gone once through its calibrate routine and once through its correction routine. Next, the system may execute its calibrate routine again or it may select a different sensor output signal to process. The frequency with which the calibrate routine is used will depend on the environment and other factors associated with a particular application. Suffice it to say that the microprocessor 40 may be programmed to execute the calibrate routine only so often as it is desired to update the information needed to calculate the corrective factors A and B.

Figure 6:
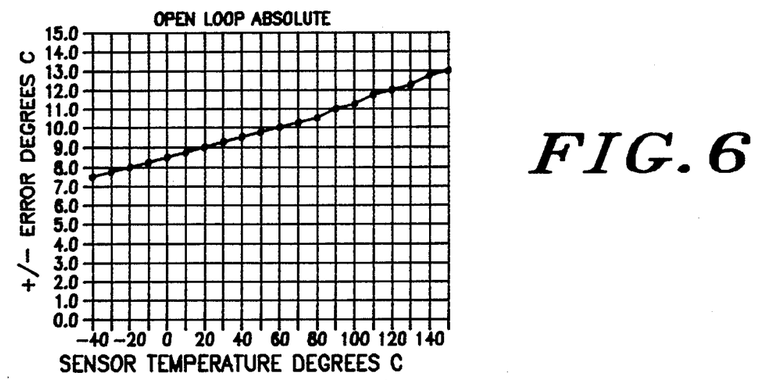
FIG. 6 is a graph depicting the theoretical worst case errors versus sensor temperature for the system shown in FIG. 2, but without utilization of the error correction scheme.
Figure 7:
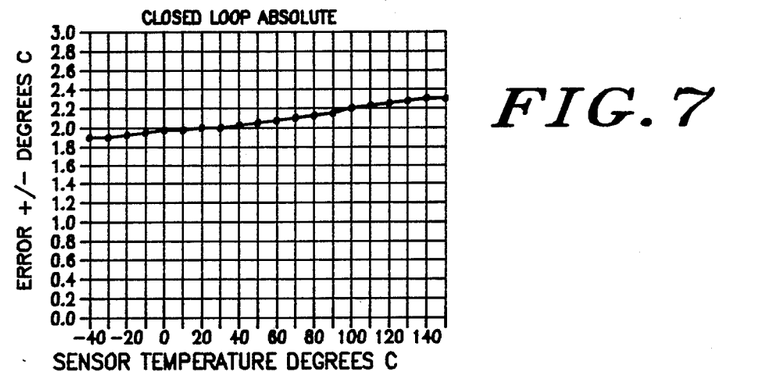
FIG. 7 is a graph depicting the theoretical worst cases errors versus sensor temperature for the system shown in FIG. 2 for the case in which the present error correction scheme is utilized.
Figure 8:
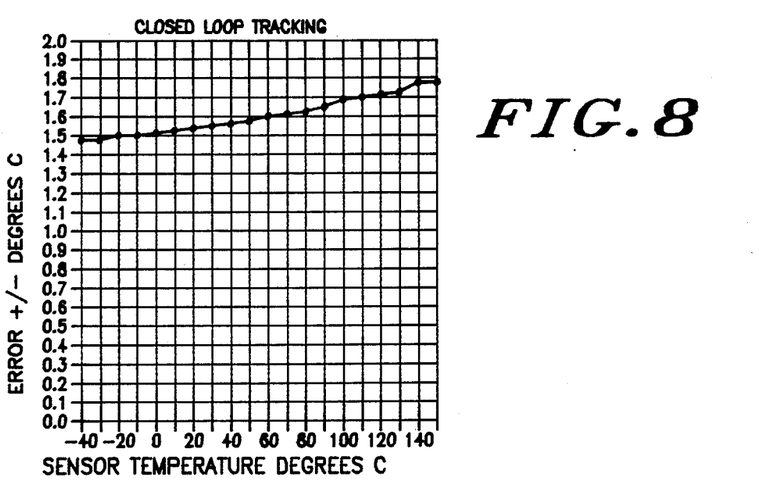
FIG. 8 shows the theoretical worst case errors between channels for the system shown in FIG. 2 for the case in which the present error correction scheme is utilized.

To illustrate the extent to which errors are corrected by the embodiment shown in FIG. 2, reference is now made to FIGS. 6, 7, and 8. In FIG. 6, the theoretically worst case errors are shown for the case in which the error correction scheme is not utilized (i.e., the correction routine is disabled). Note that the total error varies from about 7.5 degrees to about 13 degrees as the temperature of the sensor varies between −40° C. and +150° C. This excludes errors in the sensor itself.

Turning now to FIG. 7, which depicts the theoretically worst case errors for the case in which the correction routine is used, one can see that the errors have been substantially reduced. Over the temperature range of −40° C. to +150° C., the errors vary only between about 1.9 degrees and 2.3 degrees.

The tracking errors between channels have also been substantially reduced as indicated by FIG. 8. Over the temperature range of −40° C. to +150° C., the theoretically worst case errors vary from about 1.5 degrees to about 1.8 degrees.

Having described the preferred embodiment of the invention, its advantages will be apparent. High resolution is achieved by virtue of having an amplified sensor output signal, and high accuracy is achieved because the errors commonly encountered with the amplifier and its associated circuitry are automatically compensated for. Further, the system is capable of amplifying and processing a number of different sensor channels such that the channels track with each other because each channel is subject to the same amplification and error correction.

Although the invention has been described in terms of its preferred embodiment, it will be obvious to those skilled in the art that many alterations and variations made be made without departing from the invention. For example, the illustrated temperature sensors may be replaced by other types of sensors which develop output signals representative of a measured variable. Other examples of changes will be apparent. Accordingly, it is intended that all such alterations and variations be considered as within the spirit and scope of the invention as defined by the appended claims.

What is claimed is:

1. A self-calibrating system for processing the output signal of at least one sensor, comprising:
   means for establishing a reference voltage which includes an unintentional reference voltage error;
   a processing circuit, including amplifier means receiving the sensor's output signal and the reference voltage, for providing an amplified output signal, the amplified output signal including a gain error and an offset error attributable to the amplified reference voltage error, the processing circuit being constructed to develop further signals for use in computing gain and offset errors; and
   correcting means coupled to the processing circuit for sensing the amplified output signal from the amplifier means, said further signals, the reference voltage, and the output signal from the sensor for computing corrective factors based on the sensed signals, and for combining the corrective factors with the amplified output signal to produce a corrected sensor output signal.

2. A system as set forth in claim 1 wherein the system is adapted to process the outputs of multiple sensors, and wherein the processing circuit includes switch means for coupling a selected sensor to the amplifier means.

3. A system as set forth in claim 2 wherein the amplifier means has a pair of input terminals, and further including:
   means coupling the signal of a selected sensor from said switch means to one of the amplifier means' input terminals;
   an impedance network coupled between each sensor output and said switch means; and
   an impedance which matches said impedance network for coupling the reference voltage to the other input of said amplifier means.

4. A system as set forth in claim 1 wherein said corrective factors comprise a multiplier which is a function of gain error and an additive factor which is a function of offset error, gain error, and the cross-products thereof.

5. A system as set forth in claim 4 wherein the system has a calibrating mode and an operational mode, and wherein the correcting means computes the corrective factors during the calibrating mode and combines the corrective factors with the amplified output signal during the operational mode.

6. A system as set forth in claim 5 wherein said correcting means comprises an analog-to-digital converter receiving the output of the processing circuit, and a computing means receiving the output of the analog-to-digital converter.

7. A self-calibrating system for processing the outputs of multiple sensors, comprising:
   means for establishing a reference voltage;
   a switch having a plurality of input terminals and an output terminal, one input terminal thereof being coupled to the reference voltage and the other input terminals each being coupled to the output of a sensor;
   an amplifier having one input coupled to the reference voltage, another input coupled to the output terminal of the switch, and having an output;
   a microprocessor receiving the output of the amplifier, the reference voltage and the signal on the output terminal of the switch, the microprocessor being programmed to enable the switch to couple selected input terminals to the output terminal, to compute corrective factors based on inputs to the microprocessor when the reference voltage is coupled to the output terminal of the switch, and to combine the corrective factors with amplified sensor outputs received by the microprocessor.

8. A system as set forth in claim 7 wherein the operation of the amplifier and the switch give rise to errors including offset errors and gain errors, and wherein said corrective factors comprise a multiplier which is a function of gain error and an additive factor which is a function of offset error, gain error, and the cross-products thereof.

9. A system for processing and calibrating the output signal from at least one sensor so as to compensate for any gain and offset errors associated with the processing, the system comprising:

a processing circuit which develops a plurality of signals and which includes an amplifier for amplifying the output of the sensor, the amplified sensor output including gain and offset errors;

correcting means for measuring selected signals produced by the processing circuit to develop therefrom:
  1. a corrective multiplier which is a function of the gain error; and
  2. an additive factor which is a function of offset error, gain error and cross-products thereof, said correcting means also measuring the amplified sensor output and combining with it the corrective multiplier and the additive factor to develop a corrected sensor output from which errors have been substantially eliminated.

* * * * *

UNITED STATES PATENT AND TRADEMARK OFFICE
CERTIFICATE OF CORRECTION

PATENT NO. : 4,800,513
DATED : January 24, 1989
INVENTOR(S) : Robert W. Deutsch

It is certified that error appears in the above-identified patent and that said Letters Patent is hereby corrected as shown below:

In claim 1, col. 7, line 68, insert --amplifier means, and an-- between "the" and "amplified".

Signed and Sealed this

Third Day of October, 1989

Attest:

DONALD J. QUIGG

Attesting Officer

Commissioner of Patents and Trademarks